(12) United States Patent
Pahlevaninezhad et al.

(10) Patent No.: US 12,166,431 B2
(45) Date of Patent: *Dec. 10, 2024

(54) INVERTERS WITH INTEGRATED ENERGY STORAGE SUBSYSTEMS

(71) Applicant: SPARQ SYSTEMS INC., Kingston (CA)

(72) Inventors: Majid Pahlevaninezhad, Kingston (CA); Praveen Jain, Kingston (CA)

(73) Assignee: SPARQ SYSTEMS INC., Kingston (CA)

( * ) Notice: Subject to any disclaimer, the term of this patent is extended or adjusted under 35 U.S.C. 154(b) by 83 days.

This patent is subject to a terminal disclaimer.

(21) Appl. No.: 18/065,783

(22) Filed: Dec. 14, 2022

(65) Prior Publication Data

US 2024/0204687 A1 Jun. 20, 2024

(51) Int. Cl.
*H02M 7/5387* (2007.01)
*H02J 3/32* (2006.01)
*H02J 3/38* (2006.01)
*H02J 7/00* (2006.01)

(52) U.S. Cl.
CPC ............ *H02M 7/5387* (2013.01); *H02J 3/32* (2013.01); *H02J 3/381* (2013.01); *H02J 7/0013* (2013.01); *H02J 2207/50* (2020.01); *H02J 2300/24* (2020.01)

(58) Field of Classification Search
CPC .......... H02M 7/5387; H02J 3/32; H02J 3/381; H02J 7/0013; H02J 2300/24; H02J 2207/50

See application file for complete search history.

(56) References Cited

U.S. PATENT DOCUMENTS

| 11,621,666 B2* | 4/2023 | Salari | H02P 27/12 |
| | | | 318/503 |
| 11,949,344 B2* | 4/2024 | Glovinsky | H02M 3/1584 |
| 2024/0072545 A1* | 2/2024 | Pahlevaninezhad | H02M 1/007 |

* cited by examiner

*Primary Examiner* — Jared Fureman
*Assistant Examiner* — Duc M Pham
(74) *Attorney, Agent, or Firm* — Brion Raffoul (57) ABSTRACT

Systems and circuits relating to the integration of energy storage subsystems into components for use with systems that harvest energy from PV panels and that convert that energy for use with a power grid. Various configurations of inverters that integrate energy storage cells are presented. Half-bridge and full bridge configurations for the inverters are presented. The integrated energy storage cells may be battery cells, supercapacitor cells, or a combination of the two.

17 Claims, 10 Drawing Sheets

INVERTERS WITH INTEGRATED ENERGY STORAGE SUBSYSTEMS

TECHNICAL FIELD

The present invention relates to power generation. More specifically, the present invention relates to the integration of energy storage units in inverters to be used with PV panels.

BACKGROUND

There is a growing number of photovoltaic (PV) applications where direct current/alternating current (DC/AC) inverters are required to provide maximum power point tracking (MPPT) to harvest maximum solar energy from PV panels and to thereby feed clean AC electricity into the power grid. However, the energy generated by solar energy harvesting systems depends on weather conditions and can be quite intermittent. Energy storage systems can effectively resolve this issue of intermittent energy from solar energy harvesting systems by storing harvested energy and then releasing that stored energy when needed.

Figure 1:
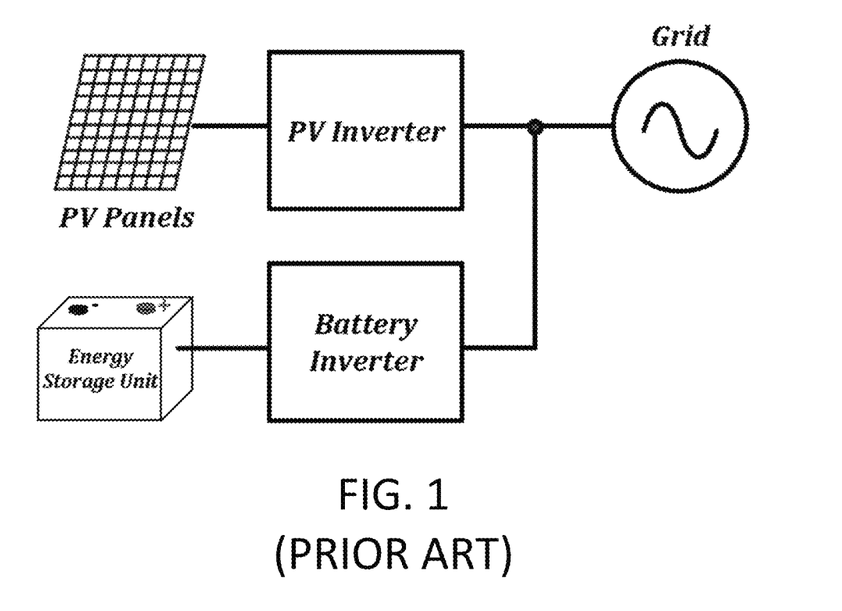
FIGS. 1 to 5 are block diagrams of various configurations of prior art systems which were used to address issues relating to PV panels, their intermittency and reliance on weather conditions.

Commonly, to address the above issue, two different power electronic converters are used—one for the PV system and one for the energy storage system. FIG. 1 is a block diagram of an existing solar energy harvesting systems with energy storage capability according to the prior art. According to FIG. 1, two separate power electronic converters are used in the system. The PV inverter is used to perform MPPT for the PV panels and to convert the harvested energy into an AC form that is compatible with the AC grid. The battery/energy storage inverter controls the charge-discharge of the energy storage and converts power from DC to AC. The main issue with this architecture is that two separate power electronic converters are needed and the system may not be cost-effective. Also, when two separate power converters are used, the PV inverter does not have the real-time information of the battery (e.g., state of charge, etc.) and the battery inverter does not have the real-time information of the PV system (e.g., available power, etc.). Thus, this architecture is unable to optimise the power flow between the different components of the system (i.e., PV, battery, Grid, and loads).

Figure 2:
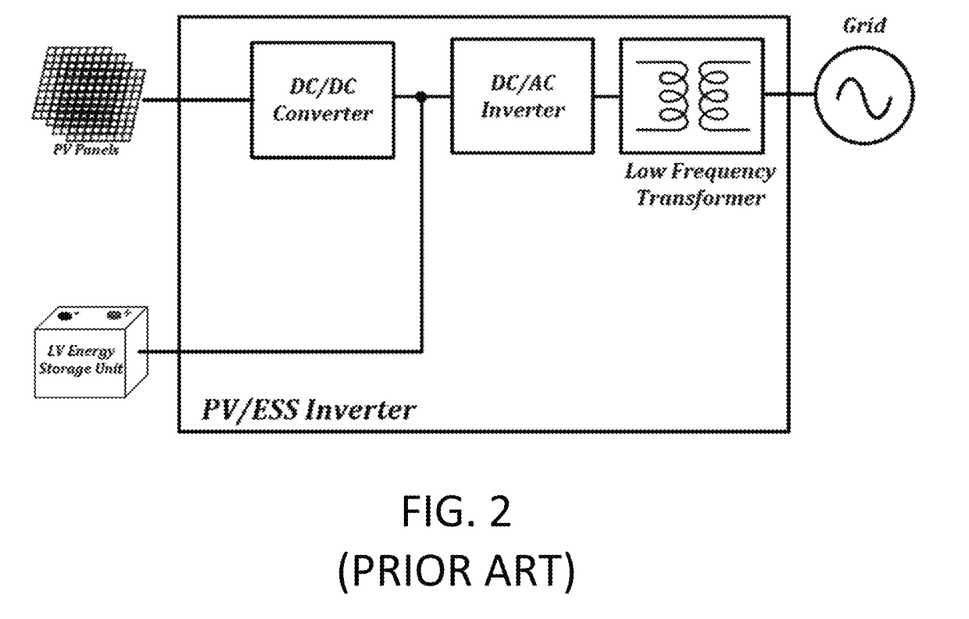

In order to address the above issues, other architectures that can combine both the PV system and the battery system were introduced. FIG. 2 shows an exemplary arrangement of such an architecture according to the prior art. According to FIG. 2, the power electronic converter includes a DC/DC converter between the PV panels and the battery/energy storage unit, a DC/AC inverter to convert DC power into AC power, and a low frequency transformer to increase the voltage and provide galvanic isolation between the grid and the system. In this architecture, the primary side of the transformer is low voltage (e.g., ~48V) and the secondary side is high voltage (~240V). Thus, the electronic components that are used in the system can have low voltage ratings. The main drawback of this architecture is the low frequency transformer. This transformer is very bulky, heavy, and has significant losses. Thus, this architecture cannot be used for higher power (i.e., greater than a few kW) and is not very scalable in terms of power.

Figure 3:
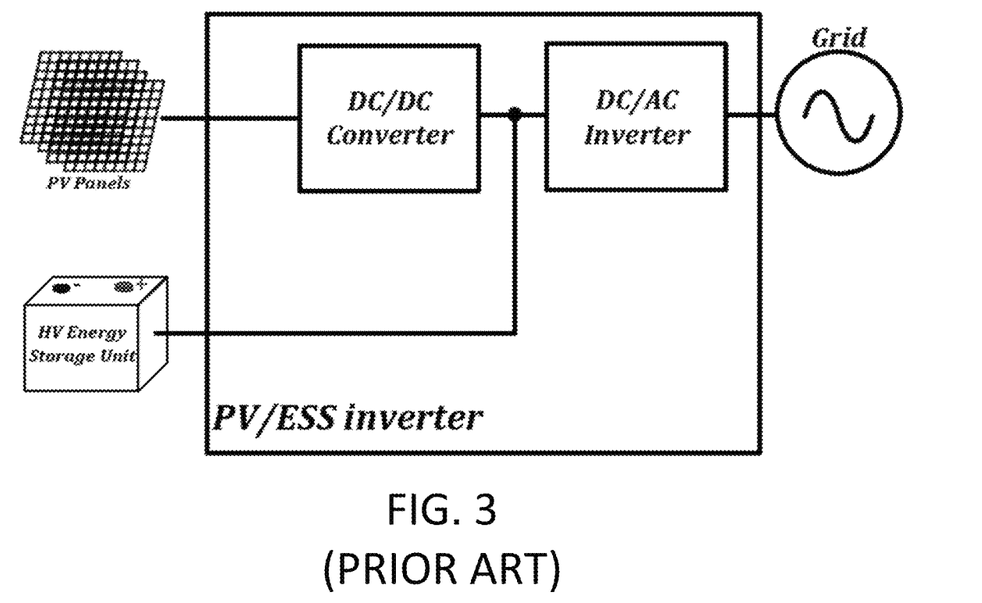

In order to eliminate the low frequency transformer, the DC/DC converter can be designed to provide isolation. FIG. 3 shows such an architecture according to the prior art and does not include a low frequency transformer. According to this figure, the DC/DC converter provides enough gain as well as the galvanic isolation between the system and the grid. Thus, high efficiency and high power density can be achieved with this architecture. However, the energy storage needs to be high voltage (i.e., higher than the peak voltage of the grid voltage). For instance, if the inverter is designed to operate with the universal voltage range (e.g., Vrms(max) =264 volts, Vpeak=372 volts), the minimum voltage of the energy storage should be fairly high (e.g., ~400V). Thus, the voltage range of the energy storage unit is very limited, and many types of batteries cannot be used in this architecture. Also, this architecture may have lower reliability due to the high voltage requirements for the energy storage unit.

Figure 4:
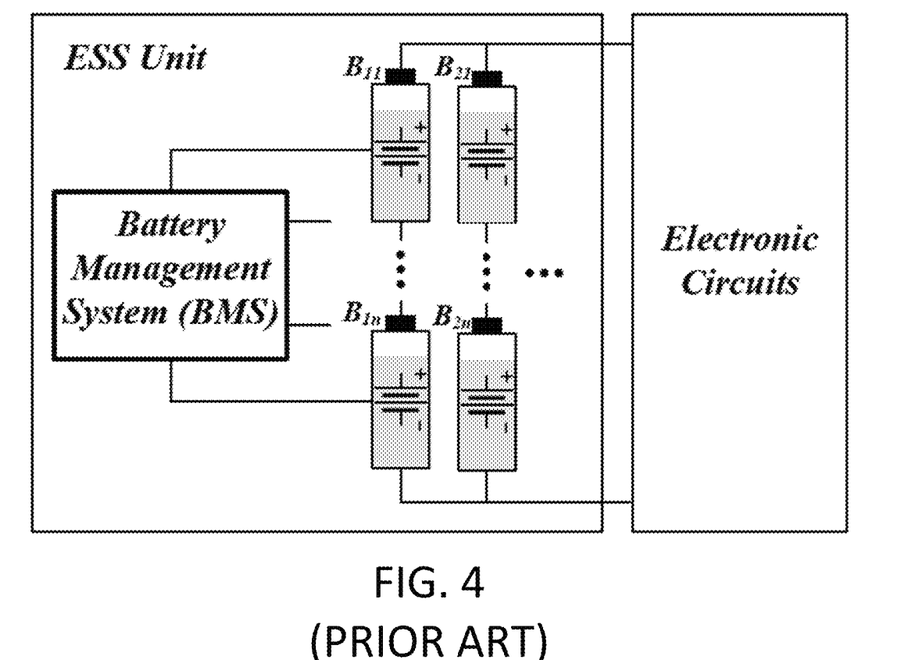

The other problem with this architecture is that the battery pack must operate at a high voltage (~400V). This has a substantial detrimental impact on the reliability and cost of the system. FIG. 4 shows a typical high voltage battery pack according to the prior art. According to his figure, the battery pack includes multiple strings of battery cells, with the strings being coupled in parallel to provide the required voltage level. Thus, a complicated battery management system (BMS) is needed in case some of the battery cells or battery cell strings deteriorate or get corrupted. Also, the system must be designed with significant margins for storage capacity (i.e., many extra cells) in order to comply with reliability requirements. Additionally, the battery pack requires complex thermal management as the cells are placed in a pack and each cell generates heat. Thus, an effective heat removal system or method must be devised for the battery pack in order to achieve reliable operation of the energy storage system. These issues increase the overall cost of the system and can jeopardize system reliability.

Figure 5:
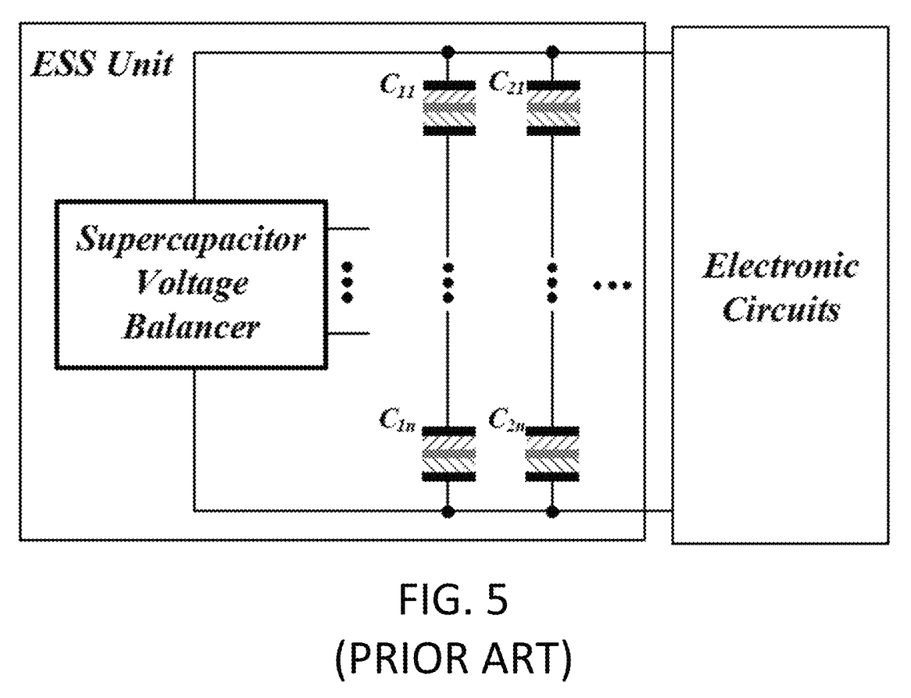

The energy storage unit can be based on various storage technologies. FIG. 5 shows an energy storage unit according to the prior art that is based on supercapacitor technology. According to this figure, strings of supercapacitors are placed in parallel to provide high storage capacity. This configuration of strings of supercapacitors also provides redundancy and reliability for the storage unit. However, this configuration has similar issues to the battery based energy storage unit. As with the battery based system, this supercapacitor based energy storage unit multiple strings of energy storage cells (supercapacitors) placed in parallel to provide the required voltage level. Thus, a supercapacitor voltage balancer is required to guarantee that the voltage across each cell does not reach beyond its maximum value (currently the maximum voltage for a typical supercapacitor cell is less than 4V).

In both energy storage unit configurations (as illustrated in FIG. 4 and FIG. 5), additional electronics (i.e., a battery management system for battery packs and a voltage balancer for supercapacitor based units) are required. In addition, complex thermal management is needed to provide a reliable energy storage solution. The energy storage unit can then be connected to other electronic circuitry to provide power/ energy. The above requirements to achieve sufficient reliability render the current energy storage solutions very costly.

Based on the above, there is therefore a need for systems and devices which mitigate if not avoid the shortcomings of the prior art.

SUMMARY

The present invention provides systems and circuits relating to the integration of energy storage subsystems into components for use with systems that harvest energy from PV panels and that convert that energy for use with a power grid. Various configurations of inverters that integrate energy storage cells are presented. Half-bridge and full bridge configurations for the inverters are presented. The integrated energy storage cells may be battery cells, supercapacitor cells, or a combination of the two.

In a first aspect, the present invention provides a micro-inverter system for receiving input DC power and for producing AC power suitable for an AC power grid, the system comprising:
- a plurality of multi-level DC/DC converters, each of said plurality of DC/DC converters receiving said input DC power from DC power sources;
- a multi-level DC/AC inverter receiving outputs of said plurality of DC/DC converters and producing said AC power, an output of said DC/AC inverter being received by said AC power grid, said inverter comprising an integrated energy storage subsystem;
- a differential geometric control system for controlling said DC/AC inverter and for controlling said plurality of DC/DC converters;
- wherein said control system controls each of said plurality of DC/DC converters to perform maximum power point tracking to extract maximum input DC power from said DC power sources.

In a second aspect, the present invention provides a multi-level DC/AC inverter for transmitting AC power to a utility power grid, the inverter comprising:
- a plurality of pairs of circuit element modules, each of said circuit element modules comprising a semiconductor;
- a plurality of energy storage sub-circuits, each energy storage sub-circuit being associated with a specific pair of circuit element modules;
- a pair of grid circuit element modules coupled in series;
- an input bus capacitor;
- a grid inductor;
- wherein
- each of said plurality of pairs of circuit element modules is coupled in series to other circuit element modules to form a chain of circuit element modules;
- each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;
- said pair of grid circuit element modules is coupled in parallel to said chain of circuit element modules;
- said grid inductor is coupled between said grid and a first coupling point that is in a middle of said chain;
- said grid is also coupled to a second coupling point that is between said pair of grid circuit element modules;
- said input bus capacitor is coupled in parallel to said chain of circuit element modules and to said pair of grid circuit element modules;
- DC power input to said inverter is received across said input bus capacitor.

In a third aspect, the present invention provides a multi-level DC/AC inverter for transmitting AC power to a utility power grid, the inverter comprising:
- a first main sub-circuit and a second main sub-circuit;
- said first main sub-circuit comprising:
  - a first plurality of pairs of circuit element modules, each of said circuit element modules in said first plurality of pairs of circuit element modules comprising a semiconductor;
  - a first plurality of energy storage sub-circuits, each energy storage sub-circuit of said first plurality of energy sub-circuits being associated with a specific pair of circuit element modules in said first plurality of circuit element modules;
- said second main sub-circuit comprises:
  - a second plurality of pairs of circuit element modules, each of said circuit element modules in said second plurality of pairs of circuit element modules comprising a semiconductor;
  - a second plurality of energy storage sub-circuits, each energy storage sub-circuit of said second plurality of energy sub-circuits being associated with a specific pair of circuit element modules in said second plurality of circuit element modules;
- an input bus capacitor;
- a grid inductor;
- wherein
- said first main sub-circuit is coupled in parallel with said second main sub-circuit and with said input bus capacitor;
- said grid inductor is coupled between said first main sub-circuit and said power grid;
- said second main sub-circuit is directly coupled to said power grid;
- each circuit element module of said first plurality of pairs of circuit element modules is coupled in series to other circuit element modules in said first plurality of pairs of circuit element modules to form a first chain of circuit element modules in said first main sub-circuit;
- each circuit element module of said second plurality of pairs of circuit element modules is coupled in series to other circuit element modules in said second plurality of pairs of circuit element modules to form a second chain of circuit element modules in said second main sub-circuit;
- each energy storage sub-circuit of said first plurality of energy storage sub-circuits is coupled between a first coupling point and a second coupling point in said first chain of circuit element modules and each energy storage subcircuit in said first plurality of energy storage sub-circuits and each pair of circuit element modules in said first plurality of circuit element modules are arranged in said first chain such that for each specific energy storage subcircuit, a specific pair of circuit element modules associated with said specific energy storage subcircuit is coupled in said first chain between a specific first coupling point and a specific second coupling point between which said specific energy storage sub-circuit is coupled;
- each energy storage sub-circuit of said second plurality of energy storage sub-circuits is coupled between a first coupling point and a second coupling point in said second chain of circuit element modules and each energy storage subcircuit in said second plurality of energy storage sub-circuits and each pair of circuit element modules in said second plurality of circuit element modules are arranged in said second chain such that for each specific energy storage subcircuit, a specific pair of circuit element modules associated with said specific energy storage subcircuit is coupled in said first chain between a specific first coupling point and a specific second coupling point between which said specific energy storage sub-circuit is coupled;

said grid inductor is coupled between said power grid and a first coupling point that is in a middle of said first chain;

said power grid is also coupled to a second coupling point that is in a middle of said second chain;

DC power input to said inverter is received across said input bus capacitor.

BRIEF DESCRIPTION OF THE DRAWINGS

The embodiments of the present invention will now be described by reference to the following figures, in which identical reference numerals in different figures indicate identical elements and in which.

DETAILED DESCRIPTION

One solution to the above issues is that of incorporating integrated energy storage into the DC/AC inverter.

It should be clear that the various configurations of circuits and arrangements detailed below will use the concept of circuit element modules. Each circuit element module includes a semiconductor, a diode, and a capacitor. For each circuit element module, the diode and capacitor are coupled in parallel with the semiconductor. The control signal for the semiconductor in each circuit element module is to be generated by the digital control system associated with each configuration/arrangement.

Figure 6:
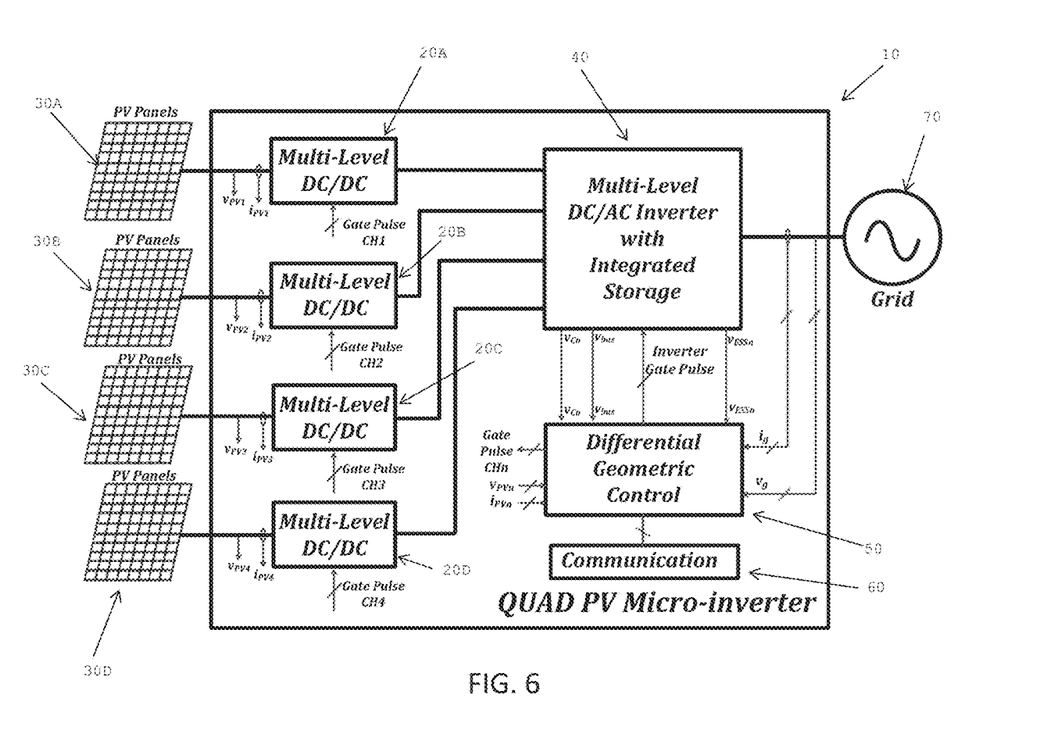
FIG. 6 is a block diagram of a microinverter according to one aspect of the present invention.

Referring to FIG. 6, illustrated is a multi-input PV microinverter with integrated energy storage. In this architecture, the energy storage is integrated to the multi-level DC/AC inverter. This arrangement will also offer the capability to charge the storage cells from both the PV panels and the utility grid.

As can be seen from FIG. 6, the micro-inverter 10 includes multi-level DC/DC converters 20A, 20B, 20C, 20D, each of which is coupled to one or more PV panels 30A, 30B, 30C, 30D. The outputs of the DC/DC converters 20A-20D are received by a multi-level DC/AC inverter 40, with the inverter 40 having integrated energy storage. The inverter 40 is controlled by a differential geometric control block 50 and this control block 50 is coupled to send and received communications to and from a communications block 60. As can be imagined, the communications block 60 sends and receives control communications to and from the control block 50. The AC output of the inverter 40 is sent to a power grid 70.

It should be clear that the differential geometric control block 50 receives voltage and current readings related to the output of the inverter 40. As well, the control block 50 receives current and voltage readings relating to the power being received by each DC/DC converter from its PV panel(s). Based on all these inputs, along with any control inputs which may have been received from the communications block 60, the control block 50 produces gate pulses for each of the DC/DC converters. As well, the control block 50 receives control outputs from the inverter 40 and produces gate pulses for the semiconductors in the inverter 40.

It should be clear that, even though a differential geometric control block is illustrated, other control schemes and control methods may be used by the control block.

Figure 7:
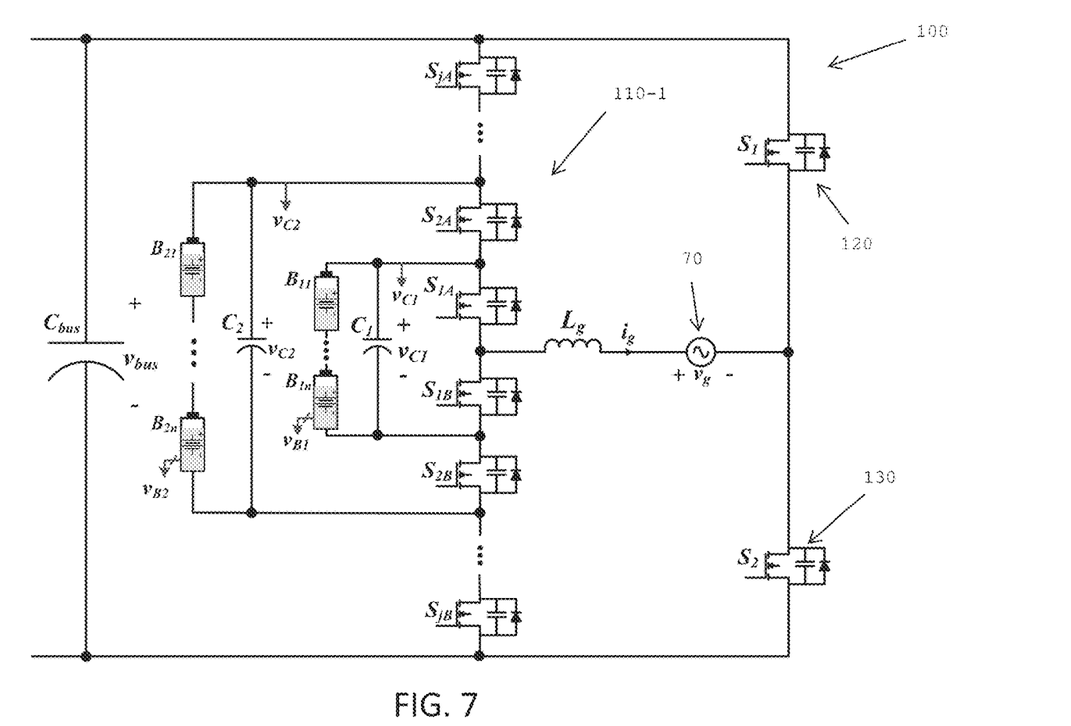
FIG. 7 is a circuit diagram of a half-bridge inverter with integrated energy storage (using battery cells) according to one aspect of the present invention.

Referring to FIG. 7, a schematic diagram of a Multi-Level (ML) DC/AC Inverter with Integrated Battery Cells is illustrated. This inverter may be used in the micro-inverter illustrated in FIG. 6. This arrangement of a DC/AC inverter is a totem-pole configuration (i.e., it includes one high frequency active leg and one low frequency active leg). The ML DC/AC inverter is responsible for regulating the DC-bus voltage ($v_{bus}$), controlling the charge-discharge of the battery cells, and injecting a high quality AC current to the utility grid. As can be seen from the figure, the ML DC/AC inverter includes:

A high frequency active multi-level leg, which includes the power semiconductors $S_{iA}$ and $S_{iB}$. These semiconductor switches are controlled such that an appropriate high frequency voltage is created.

A low frequency active multi-level leg, which includes the power semiconductors $S_1$ and $S_2$. These semiconductor switches are synchronised with the grid voltage, $v_g$.

Battery cells along with the respective capacitors, which are responsible for storing energy and releasing that energy when needed.

A DC (input) bus capacitor $C_{bus}$ which is responsible for providing the double-frequency ripple.

As can be seen from FIG. 7, the inverter 100 includes a number of circuit element modules. As can be seen, most of the circuit element modules are paired with one another. The paired circuit element modules are coupled as a single chain 110-1 in a series configuration with each pair of circuit element modules being associated with a specific string of battery cells, each string of battery cells being multiple battery cells coupled in series. The associated string of battery cells is coupled to be in parallel an associated capacitor. Each string of battery cells, in parallel with its associated capacitor, is also in parallel with the pair of circuit element modules that the string of battery cells is associated with. Thus, each string of battery cells is coupled between a first and a second coupling point on the chain and the pair of circuit element modules that is associated with the string of battery cells is coupled in series (to each other or to other modules) between the first and second coupling points. As can be seen, other circuit element modules may also be between those first and second coupling points. The string of battery cells (and its associated capacitor) associated with which pair of circuit element modules are detailed in the table below:

| Battery cells in the string | Associated capacitor | First circuit element module in the pair | Second circuit element module in the pair |
|---|---|---|---|
| $B_{11}, \ldots, B_{1n}$ | $C_1$ | $S_{1A}$ | $S_{1B}$ |
| $B_{21}, \ldots, B_{2n}$ | $C_2$ | $S_{2A}$ | $S_{2B}$ |

The chain of circuit element modules for the inverter is coupled in parallel with a bus capacitance $C_{bus}$. Coupled at a first coupling point that is in the middle of the chain 100-1 is one end of a grid inductor $L_g$ with the other end of the grid inductor being coupled to the utility/power grid 70. The utility/power grid 70 is also coupled to a second coupling point that is in between a pair of series coupled grid circuit element modules 120, 130 (referred to as power semiconductors $S_1$ and $S_2$ above). This pair of series coupled grid circuit element modules are then coupled, in turn, in parallel with the chain of circuit element modules 110-1 and the bus capacitance. The input to the inverter is received across the bus capacitance.

Figure 8:
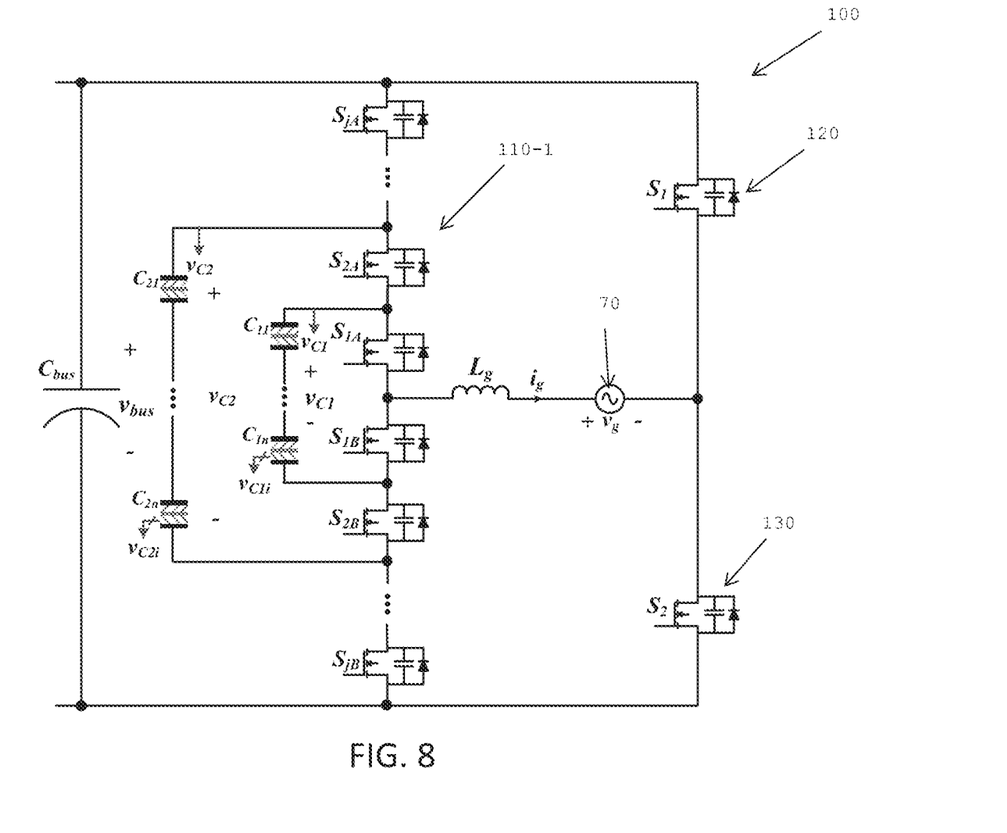
FIG. 8 is a circuit diagram of an inverter with integrated energy storage (using supercapacitor cells) according to another aspect of the present invention.

Referring to FIG. 8, illustrated is a multi-level DC/AC inverter similar to that illustrated in FIG. 7 with the difference that the inverter in FIG. 8 uses strings of supercapacitor cells instead of strings of battery cells. As can be seen, other than the use of strings of supercapacitor cells in place of the strings of battery cells (with each string of supercapacitor cells, unlike each string of battery cells, not having an associated capacitor), the inverter in FIG. 8 has the same components as the inverter in FIG. 7. Accordingly, similar reference numbers have been used in FIG. 8 for similar components in FIG. 7. For clarity, the string of supercapacitor cells associated with which pair of circuit element modules are detailed in the table below:

| Supercapacitor cells in the string | First circuit element module in the pair | Second circuit element module in the pair |
|---|---|---|
| $C_{11}, \ldots, C_{1n}$ | $S_{1A}$ | $S_{1B}$ |
| $C_{21}, \ldots, C_{2n}$ | $S_{2A}$ | $S_{2B}$ |

Figure 9:
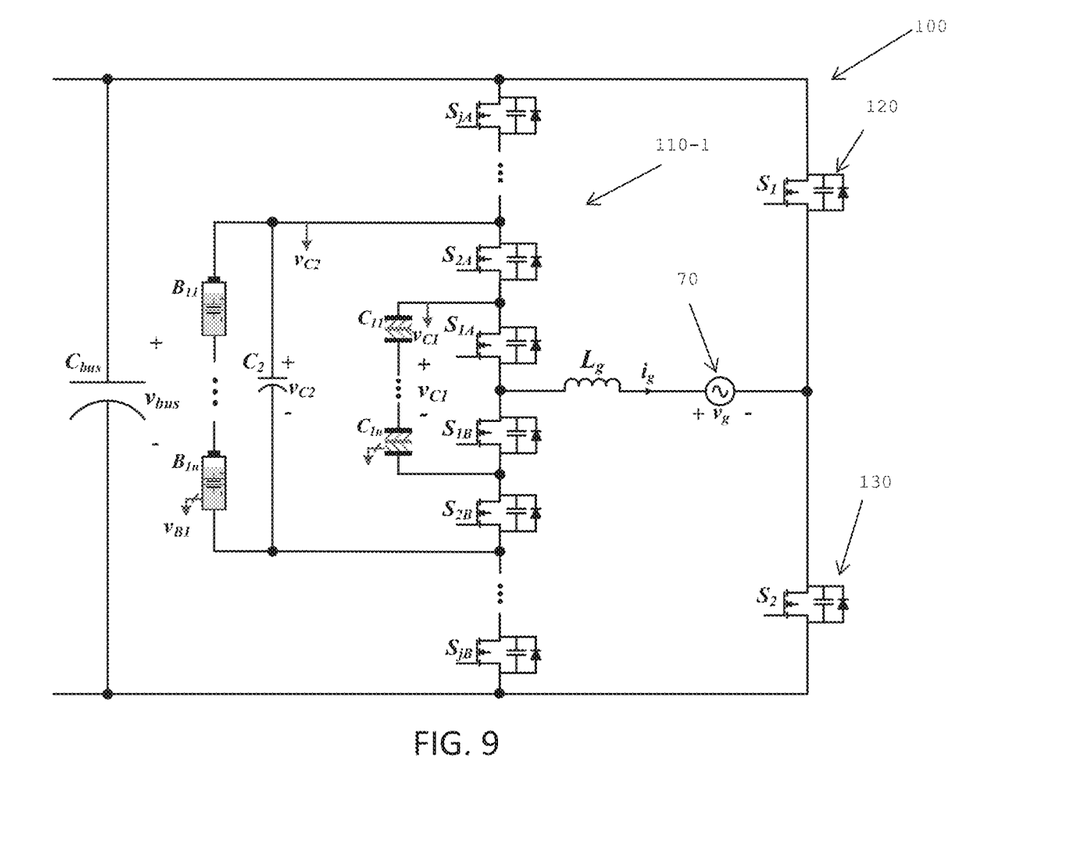
FIG. 9 is a circuit diagram of an inverter with integrated energy storage (using a combination of battery cells and supercapacitor cells) according to yet another aspect of the present invention.

Referring to FIG. 9, illustrated is a multi-level DC/AC inverter with integrated energy cells with the energy cells being a combination of battery cells and supercapacitor cells. As can be seen from FIG. 9, the inverter circuit is the same as the inverter circuit in FIG. 7 and FIG. 8 with the difference that, instead of only using exclusively strings of battery cells (as in FIG. 7) or using exclusively strings of supercapacitor cells (as in FIG. 8), the inverter circuit in FIG. 9 uses both battery cells and supercapacitor cells. The inverter circuit in FIG. 9 is identical to that in FIG. 7 and FIG. 8 with the difference that the inverter circuit in FIG. 9 has a string of supercapacitor cells associated with the innermost pair of circuit element modules in the string of circuit element modules and a string of battery cells associated with the next innermost pair of circuit element modules. For clarity, similar reference numbers have been used in FIG. 9 as in FIG. 7 and FIG. 8 for similar components. Provided below is a table that details which strings of supercapacitor cells and which strings of battery cells are associated with which pair of circuit element modules.

| Battery cells in the string | Supercapacitor cells in the string | First circuit element module in the pair | Second circuit element module in the pair |
|---|---|---|---|
| NONE | $C_{11}, \ldots C_{1n}$ | $S_{1A}$ | $S_{1B}$ |
| $B_{11}, \ldots, B_{1n}$ | NONE | $S_{2A}$ | $S_{2B}$ |

It should be clear that any combination of supercapacitor cells and battery cells may be used in the circuit of FIG. 9.

Figure 10:
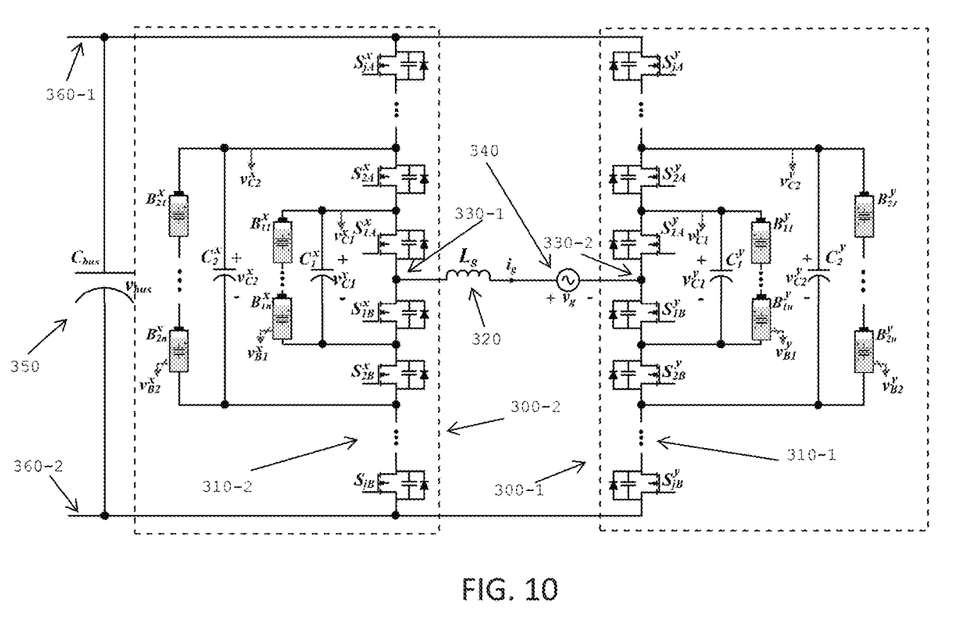
FIG. 10 is a circuit diagram of a full-bridge inverter with integrated energy storage (using battery cells) according to one aspect of the present invention.

Referring to FIG. 10, provided is a schematic diagram of a Multi-Level (ML) DC/AC Inverter with Integrated Battery Cells. This arrangement is a full-bridge configuration (i.e., it includes two high frequency active legs). The ML DC/AC inverter is responsible for regulating the DC-bus voltage, $v_{bus}$, controlling the charge-discharge of the battery cells, and injecting a high quality AC current to the utility grid. As can be seen from FIG. 10, the ML DC/AC inverter in this configuration includes:

- Two high frequency active multi-level legs which include the power semiconductors $S^x_{iA}$ and $S^x_{iB}$ and the power semiconductors $S^y_{iA}$ and $S^y_{iB}$. These semiconductor switches are controlled such that an appropriate high frequency voltage is created by the inverter;
- Battery cells along with the respective capacitors. These are responsible for storing energy and release it when needed;
- A DC bus capacitor $C_{bus}$, which is responsible for providing the double-frequency ripple;
- A grid inductor $L_g$ coupled between the grid and one of the main sub-circuits.

As can be seen from FIG. 10, the inverter is divided into two main sub-circuits. Main sub-circuits 300-1, 300-2 may be identical to one another. Each main sub-circuit has a chain of circuit element modules 310-1, 310-2. As with the chains of circuit element modules in the other inverter configurations discussed, each chain of circuit element modules uses paired circuit element modules. Each chain has multiple paired circuit element modules coupled as a single chain 110-1 in a series configuration with each pair of circuit element modules being associated with a specific string of battery cells. Each string of battery cells are multiple battery cells coupled in series and each string of battery cells is coupled to be in parallel an associated capacitor. Each string of battery cells, in parallel with its associated capacitor, is also in parallel with the pair of circuit element modules that the string of battery cells is associated with. Thus, each string of battery cells is coupled between a first and a second coupling point on the chain and the pair of circuit element modules that is associated with the string of battery cells is coupled in series (to each other or to other modules) between the first and second coupling points. As can be seen, other circuit element modules may also be between those first and second coupling points. For the first main sub-circuit 300-1, the chain 310-1 has strings of battery cells (and its associated capacitor) associated with which pair of circuit element modules as detailed in the table below:

| Battery cells in the string | Associated capacitor | First circuit element module in the pair | Second circuit element module in the pair |
|---|---|---|---|
| $B^y_{11}, \ldots, B^y_{1n}$ | $C^y_1$ | $S^y_{1A}$ | $S^y_{1B}$ |
| $B^y_{21}, \ldots, B^y_{2n}$ | $C^y_2$ | $S^y_{2A}$ | $S^y_{2B}$ |

It should be clear from the Figure that multiple other strings of battery cells, associated with modules $S^y_{jA}$ and $S^y_{jB}$, may be at the ends of this chain 310-1 of modules.

For clarity, for the second main sub-circuit 300-2, the chain 310-2 has strings of battery cells (and its associated capacitor) associated with which pair of circuit element modules as detailed in the table below:

| Battery cells in the string | Associated capacitor | First circuit element module in the pair | Second circuit element module in the pair |
|---|---|---|---|
| $B^x_{11}, \ldots, B^x_{1n}$ | $C^x_1$ | $S^x_{1A}$ | $S^x_{1B}$ |
| $B^x_{21}, \ldots, B^x_{2n}$ | $C^x_2$ | $S^x_{2A}$ | $S^x_{2B}$ |

It should be clear from the Figure that multiple other strings of battery cells, associated with modules $S^x_{jA}$ and $S^x_{jB}$, may be at the ends of this second chain 310-2 of modules.

As can be seen, the grid inductor 320 is coupled between a midpoint 330-1 coupling point in the chain 310-2 and the grid 340. The grid 340 is coupled to the midpoint 330-2 coupling point in the chain 310-1. The bus capacitor 350 is coupled in parallel to the two main subcircuits. The DC input to the inverter is received through input leads 360-1, 360-2 and the bus capacitor 350 is coupled between these two input leads.

Figure 11:
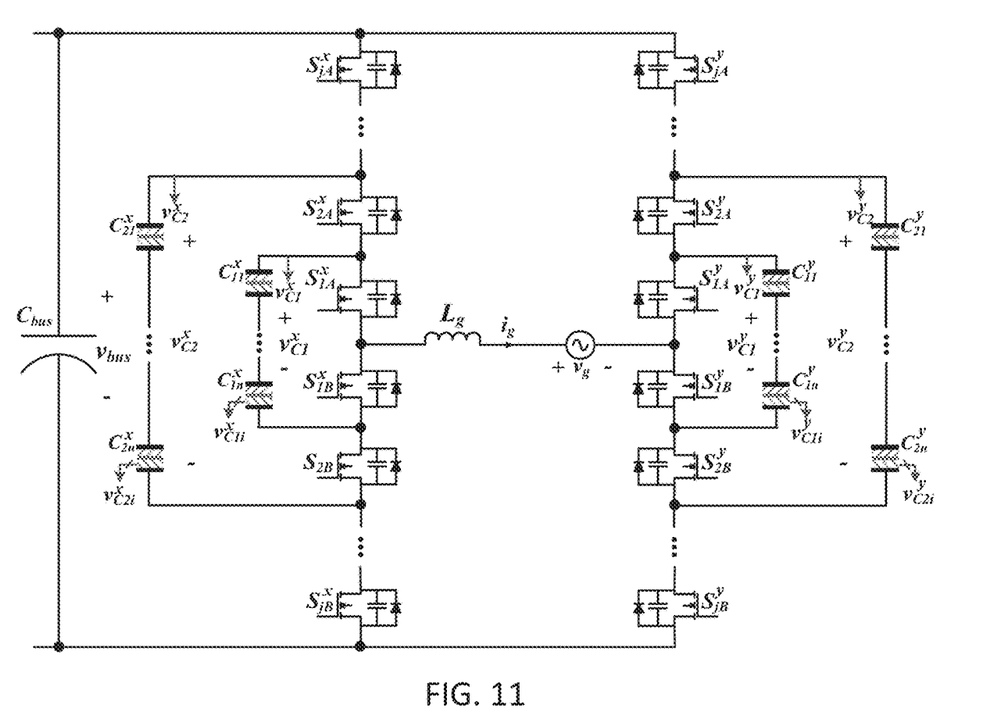
FIG. 11 is a circuit diagram of a full-bridge inverter with integrated energy storage (using supercapacitor cells) according to another aspect of the present invention.

Referring to FIG. 11, a multi-level DC/AC inverter with integrated supercapacitor cells is illustrated. As can be seen, the architecture of the system in FIG. 11 is identical to that in FIG. 10 with the difference that the inverter in FIG. 11 uses strings of supercapacitor cells instead of strings of battery cells.

Figure 12:
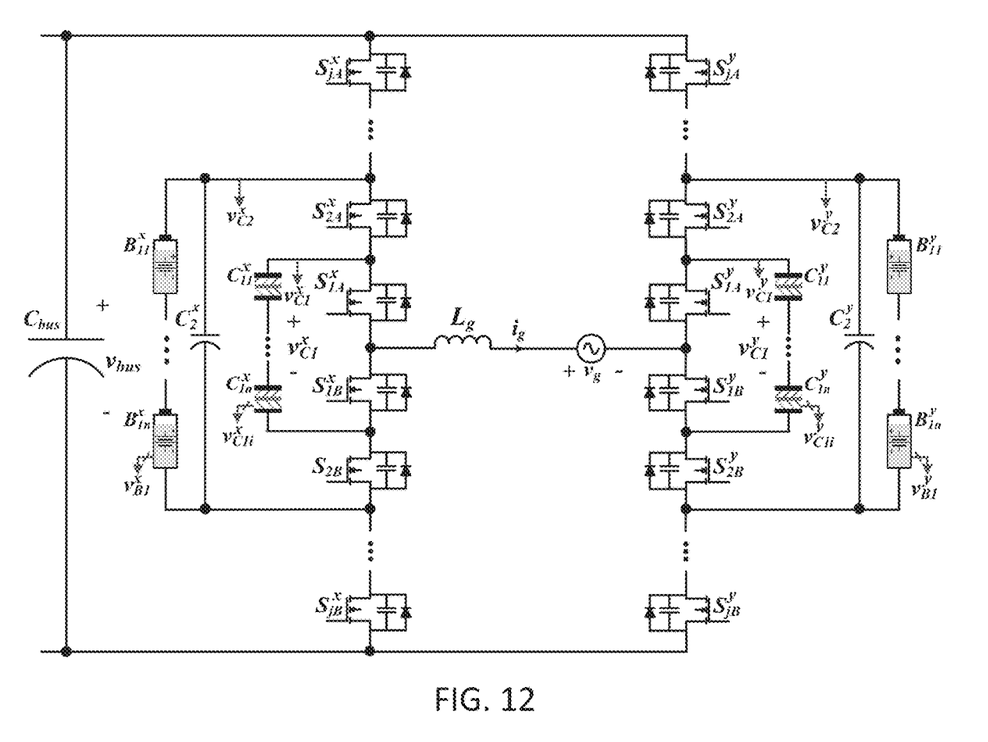
FIG. 12 is a circuit diagram of a full-bridge inverter with integrated energy storage (using both supercapacitor cells and battery cells) according to a further aspect of the present invention.

Referring to FIG. 12, a multi-level DC/AC inverter with integrated hybrid battery and supercapacitor cells is illustrated. As can be seen, the architecture of the system in FIG. 12 is identical to that in FIG. 10 with the difference that the inverter in FIG. 12 uses strings of either supercapacitor cells or battery cells instead of exclusively using battery cells as in FIG. 10. It should be clear that, when strings of battery cells are used, an associated capacitor is also used for each string.

Regarding the energy storage configurations, as can be seen, the inverters in the figures use energy storage sub-circuits with each energy storage sub-circuit being associated with a specific pair of circuit element modules. In some of the architectures, the energy storage sub-circuits are strings of battery cells and include an associated capacitor. In other architectures, the energy storage sub-circuits are strings of supercapacitor cells. In yet other architectures, the energy storage sub-circuits are a mix of strings of supercapacitor cells and strings of battery cells (with associated capacitor(s)).

It should be clear that, for the full-bridge configurations illustrated in this document, unbalanced configurations may be used. FIG. 10 illustrates a balanced configuration in that the main sub-circuits are identical to one another. Unbalanced configurations, where the main sub-circuits are different from one another, may be used. This means that one main sub-circuit may use a different number of circuit element modules from the other main sub-circuit. As well, the number and configuration of energy storage sub-circuits for the full bridge configurations can also be dissimilar between main sub-circuits. Thus, one main sub-circuit may have a different configuration from the other main sub-circuit in terms of the number of circuit element modules and in terms of the number and configuration of energy storage sub-circuits. Unbalanced configurations and the consequences of the unbalanced configuration can be address using the control system to produce the desired AC power for the power grid.

A person understanding this invention may now conceive of alternative structures and embodiments or variations of the above all of which are intended to fall within the scope of the invention as defined in the claims that follow.

We claim:

1. A microinverter system for receiving input DC power and for producing AC power suitable for an AC power grid, the system comprising:
   a plurality of multi-level DC/DC converters, each of said plurality of DC/DC converters receiving said input DC power from DC power sources;
   a multi-level DC/AC inverter receiving outputs of said plurality of DC/DC converters and producing said AC power, an output of said DC/AC inverter being received by said AC power grid, said inverter comprising an integrated energy storage subsystem;
   a differential geometric control system for controlling said DC/AC inverter and for controlling said plurality of DC/DC converters;
   wherein said control system controls each of said plurality of DC/DC converters to perform maximum power point tracking to extract maximum input DC power from said DC power sources.

2. The microinverter system according to claim 1, wherein said DC/AC inverter comprises:
   a plurality of pairs of circuit element modules, each of said circuit element modules comprising a semiconductor;
   a plurality of energy storage sub-circuits, each energy storage sub-circuit being associated with a specific pair of circuit element modules;
   a pair of grid circuit element modules coupled in series;
   an input bus capacitor;
   a grid inductor;
   wherein
   each of said plurality of pairs of circuit element modules is coupled in series to other circuit element modules to form a chain of circuit element modules;
   each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;
   said pair of grid circuit element modules is coupled in parallel to said chain of circuit element modules;
   said grid inductor is coupled between said AC power grid and a first coupling point that is in a middle of said chain;
   said AC power grid is also coupled to a second coupling point that is between said pair of grid circuit element modules;
   said input bus capacitor is coupled in parallel to said chain of circuit element modules and to said pair of grid circuit element modules;
   DC power input to said inverter is received across said input bus capacitor.

3. The microinverter according to claim 2, wherein each of said energy storage sub-circuit comprises:
- a plurality of battery cells coupled in series to one another to form a string of battery cells; and
- an associated capacitor coupled in parallel to said string of battery cells.

4. The microinverter according to claim 2, wherein each of said energy storage sub-circuit comprises a plurality of supercapacitor cells coupled in series to one another to form a string of supercapacitor cells.

5. The microinverter according to claim 2, wherein each of said energy storage sub-circuit comprises either:
- a plurality of battery cells coupled in series to one another to form a string of battery cells; and an associated capacitor coupled in parallel to said string of battery cells;

or

- a plurality of supercapacitor cells coupled in series to one another to form a string of supercapacitor cells.

6. The microinverter according to claim 1, wherein said DC/AC inverter comprises:
- a first main sub-circuit and a second main sub-circuit;
- said first main sub-circuit comprising:
  - a first plurality of pairs of circuit element modules, each of said circuit element modules in said first plurality of pairs of circuit element modules comprising a semiconductor;
  - a first plurality of energy storage sub-circuits, each energy storage sub-circuit of said first plurality of energy sub-circuits being associated with a specific pair of circuit element modules in said first plurality of circuit element modules;
- said second main sub-circuit comprising:
  - a second plurality of pairs of circuit element modules, each of said circuit element modules in said second plurality of pairs of circuit element modules comprising a semiconductor;
  - a second plurality of energy storage sub-circuits, each energy storage sub-circuit of said second plurality of energy sub-circuits being associated with a specific pair of circuit element modules in said second plurality of circuit element modules;
- an input bus capacitor;
- a grid inductor;

wherein
- said first main sub-circuit is coupled in parallel with said second main sub-circuit and with said input bus capacitor;
- said grid inductor is coupled between said first main sub-circuit and said AC power grid;
- said second main sub-circuit is directly coupled to said AC power grid;
- each circuit element module of said first plurality of pairs of circuit element modules is coupled in series to other circuit element modules in said first plurality of pairs of circuit element modules to form a first chain of circuit element modules in said first main sub-circuit;
- each circuit element module of said second plurality of pairs of circuit element modules is coupled in series to other circuit element modules in said second plurality of pairs of circuit element modules to form a second chain of circuit element modules in said second main sub-circuit;
- each energy storage sub-circuit of said first plurality of energy storage sub-circuits is coupled between a first coupling point and a second coupling point in said first chain of circuit element modules and each energy storage subcircuit in said first plurality of energy storage sub-circuits and each pair of circuit element modules in said first plurality of circuit element modules are arranged in said first chain such that for each specific energy storage subcircuit, a specific pair of circuit element modules associated with said specific energy storage subcircuit is coupled in said first chain between a specific first coupling point and a specific second coupling point between which said specific energy storage sub-circuit is coupled;
- each energy storage sub-circuit of said second plurality of energy storage sub-circuits is coupled between a first coupling point and a second coupling point in said second chain of circuit element modules and each energy storage subcircuit in said second plurality of energy storage sub-circuits and each pair of circuit element modules in said second plurality of circuit element modules are arranged in said second chain such that for each specific energy storage subcircuit, a specific pair of circuit element modules associated with said specific energy storage subcircuit is coupled in said first chain between a specific first coupling point and a specific second coupling point between which said specific energy storage sub-circuit is coupled;
- said grid inductor is coupled between said AC power grid and a first coupling point that is in a middle of said first chain;
- said AC power grid is also coupled to a second coupling point that is in a middle of said second chain;
- DC power input to said inverter is received across said input bus capacitor.

7. The microinverter according to claim 6, wherein each of said energy storage sub-circuit comprises:
- a plurality of battery cells coupled in series to one another to form a string of battery cells; and
- an associated capacitor coupled in parallel to said string of battery cells.

8. The microinverter according to claim 6, wherein each of said energy storage sub-circuit comprises a plurality of supercapacitor cells coupled in series to one another to form a string of supercapacitor cells.

9. The microinverter according to claim 6, wherein each of said energy storage sub-circuit comprises either:
- a plurality of battery cells coupled in series to one another to form a string of battery cells;
- and an associated capacitor coupled in parallel to said string of battery cells;

or

- a plurality of supercapacitor cells coupled in series to one another to form a string of supercapacitor cells.

10. A multi-level DC/AC inverter for transmitting AC power to a utility power grid, the inverter comprising:
- a plurality of pairs of circuit element modules, each of said circuit element modules comprising a semiconductor;
- a plurality of energy storage sub-circuits, each energy storage sub-circuit being associated with a specific pair of circuit element modules;
- a pair of grid circuit element modules coupled in series;
- an input bus capacitor;
- a grid inductor;

wherein
- each of said plurality of pairs of circuit element modules is coupled in series to other circuit element modules to form a chain of circuit element modules;
- each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;

said pair of grid circuit element modules is coupled in parallel to said chain of circuit element modules;

said grid inductor is coupled between said grid and a first coupling point that is in a middle of said chain;

said grid is also coupled to a second coupling point that is between said pair of grid circuit element modules;

said input bus capacitor is coupled in parallel to said chain of circuit element modules and to said pair of grid circuit element modules;

DC power input to said inverter is received across said input bus capacitor.

11. The inverter according to claim 10, wherein each of said energy storage sub-circuit comprises:
a plurality of battery cells coupled in series to one another to form a string of battery cells; and an associated capacitor coupled in parallel to said string of battery cells.

12. The inverter according to claim 10, wherein each of said energy storage sub-circuit comprises a plurality of supercapacitor cells coupled in series to one another to form a string of supercapacitor cells.

13. The inverter according to claim 10, wherein each of said energy storage sub-circuit comprises either:
a plurality of battery cells coupled in series to one another to form a string of battery cells;
and an associated capacitor coupled in parallel to said string of battery cells;
or
a plurality of supercapacitor cells coupled in series to one another to form a string of supercapacitor cells.

14. A multi-level DC/AC inverter for transmitting AC power to a utility power grid, the inverter comprising:
a first main sub-circuit and a second main sub-circuit;
said first main sub-circuit comprising:
a first plurality of pairs of circuit element modules, each of said circuit element modules in said first plurality of pairs of circuit element modules comprising a semiconductor;
a first plurality of energy storage sub-circuits, each energy storage sub-circuit of said first plurality of energy sub-circuits being associated with a specific pair of circuit element modules in said first plurality of circuit element modules;
said second main sub-circuit comprises:
a second plurality of pairs of circuit element modules, each of said circuit element modules in said second plurality of pairs of circuit element modules comprising a semiconductor;
a second plurality of energy storage sub-circuits, each energy storage sub-circuit of said second plurality of energy sub-circuits being associated with a specific pair of circuit element modules in said second plurality of circuit element modules;
an input bus capacitor;
a grid inductor;
wherein
said first main sub-circuit is coupled in parallel with said second main sub-circuit and with said input bus capacitor;
said grid inductor is coupled between said first main sub-circuit and said power grid;
said second main sub-circuit is directly coupled to said power grid;
each circuit element module of said first plurality of pairs of circuit element modules is coupled in series to other circuit element modules in said first plurality of pairs of circuit element modules to form a first chain of circuit element modules in said first main sub-circuit;
each circuit element module of said second plurality of pairs of circuit element modules is coupled in series to other circuit element modules in said second plurality of pairs of circuit element modules to form a second chain of circuit element modules in said second main sub-circuit;
each energy storage sub-circuit of said first plurality of energy storage sub-circuits is coupled between a first coupling point and a second coupling point in said first chain of circuit element modules and each energy storage subcircuit in said first plurality of energy storage sub-circuits and each pair of circuit element modules in said first plurality of circuit element modules are arranged in said first chain such that for each specific energy storage subcircuit, a specific pair of circuit element modules associated with said specific energy storage subcircuit is coupled in said first chain between a specific first coupling point and a specific second coupling point between which said specific energy storage sub-circuit is coupled;
each energy storage sub-circuit of said second plurality of energy storage sub-circuits is coupled between a first coupling point and a second coupling point in said second chain of circuit element modules and each energy storage subcircuit in said second plurality of energy storage sub-circuits and each pair of circuit element modules in said second plurality of circuit element modules are arranged in said second chain such that for each specific energy storage subcircuit, a specific pair of circuit element modules associated with said specific energy storage subcircuit is coupled in said first chain between a specific first coupling point and a specific second coupling point between which said specific energy storage sub-circuit is coupled;
said grid inductor is coupled between said power grid and a first coupling point that is in a middle of said first chain;
said power grid is also coupled to a second coupling point that is in a middle of said second chain;
DC power input to said inverter is received across said input bus capacitor.

15. The inverter according to claim 14, wherein each of said energy storage sub-circuit comprises:
a plurality of battery cells coupled in series to one another to form a string of battery cells;
and an associated capacitor coupled in parallel to said string of battery cells.

16. The inverter according to claim 14, wherein each of said energy storage sub-circuit comprises a plurality of supercapacitor cells coupled in series to one another to form a string of supercapacitor cells.

17. The inverter according to claim 14, wherein each of said energy storage sub-circuit comprises either:
- a plurality of battery cells coupled in series to one another to form a string of battery cells;
- and an associated capacitor coupled in parallel to said string of battery cells;
- or
- a plurality of supercapacitor cells coupled in series to one another to form a string of supercapacitor cells.

* * * * *